INVENTOR.
DON R. HILL
and ERNEST C. CHASSER
BY *Michael Williams*
ATTORNEY

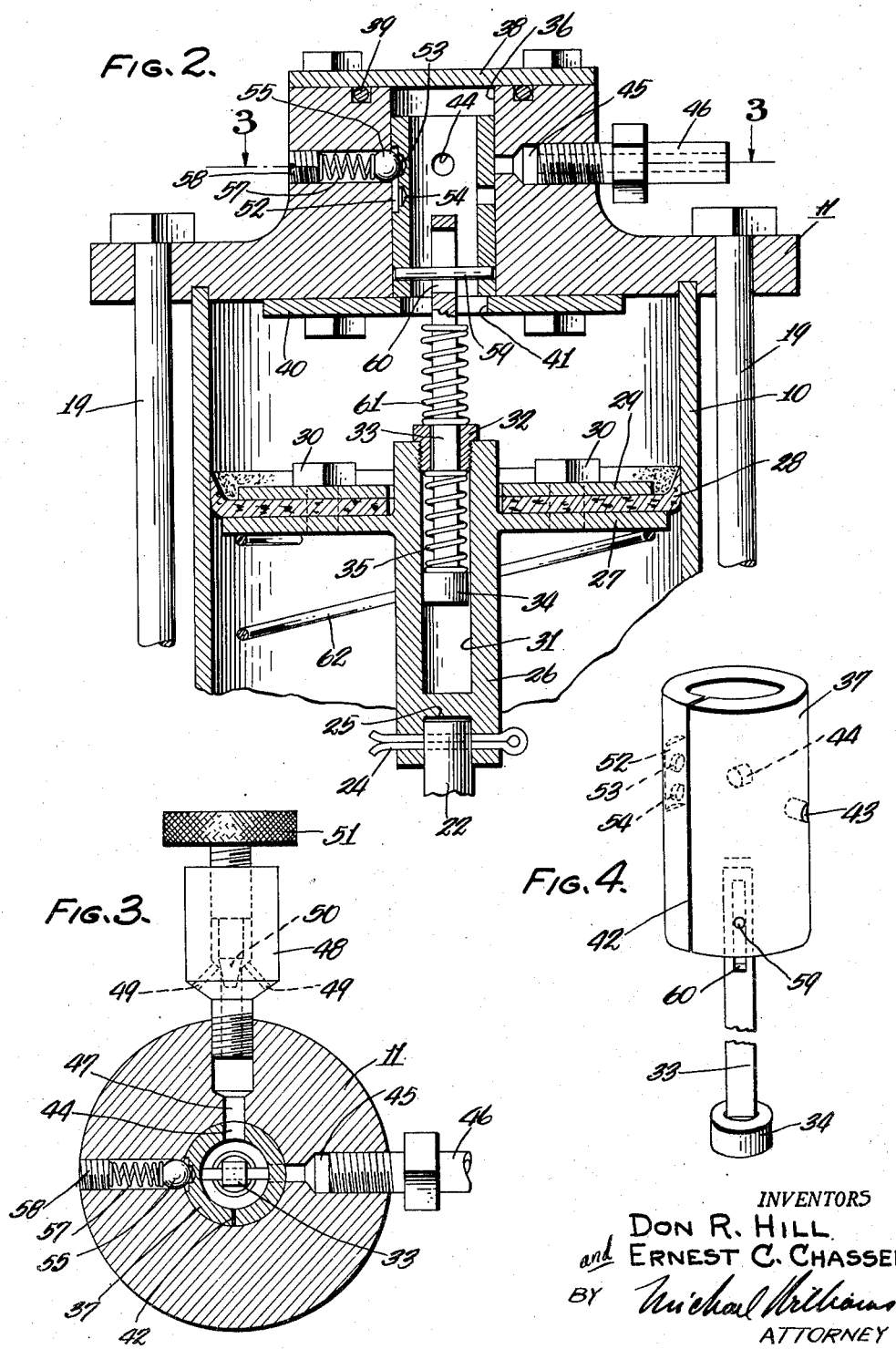

2,804,055

FLUID MOTOR WITH PISTON ACTUATED VALVE MEANS

Don R. Hill, deceased, late of Warren, Ohio, by Martha H. Hill, executrix, and Ernest C. Chasser, Warren, Ohio Continuation of abandoned application Serial No. 66,422, December 21, 1948. This application October 26, 1953, Serial No. 388,312

13 Claims. (Cl. 121—164)

Our invention relates to motor and control means, and the principal object of our invention is to provide new and improved means of such character. This application is a continuation of an application of the same title filed December 21, 1948, Serial Number 66,422, and now abandoned.

Our invention is herein disclosed in the form of a fluid motor construction wherein it has large application, and although disclosure will largely refer to such construction, it will be appreciated that the invention is not limited thereto.

Fluid motors, and still more specifically, air motors, have a multitude of uses, and there is a decided need in the industry for a motor of this kind which will operate satisfactorily and efficiently over long periods of use. The motors of prior design have been costly to manufacture if satisfactory and efficient use is contemplated; on the other hand motors of less expensive manufacture have been inefficient and have been costly from a maintenance standpoint. Our invention overcomes these difficulties and provides a highly efficient motor which will operate under all normal conditions for a long time without requiring maintenance, and yet is of economical manufacture.

In the drawings accompanying this specification and forming part of this application, there is shown, for purposes of illustration, an embodiment which our invention may assume, and in these drawings:

Figure 2 is a fragmentary view, drawn to slightly enlarged scale, showing parts of the fluid motor in different position, Figure 3 is a transverse sectional view corresponding generally to the line 3—3 of Figure 2, and Figure 4 is a broken perspective view of a part of the valving mechanism.

Figure 1:
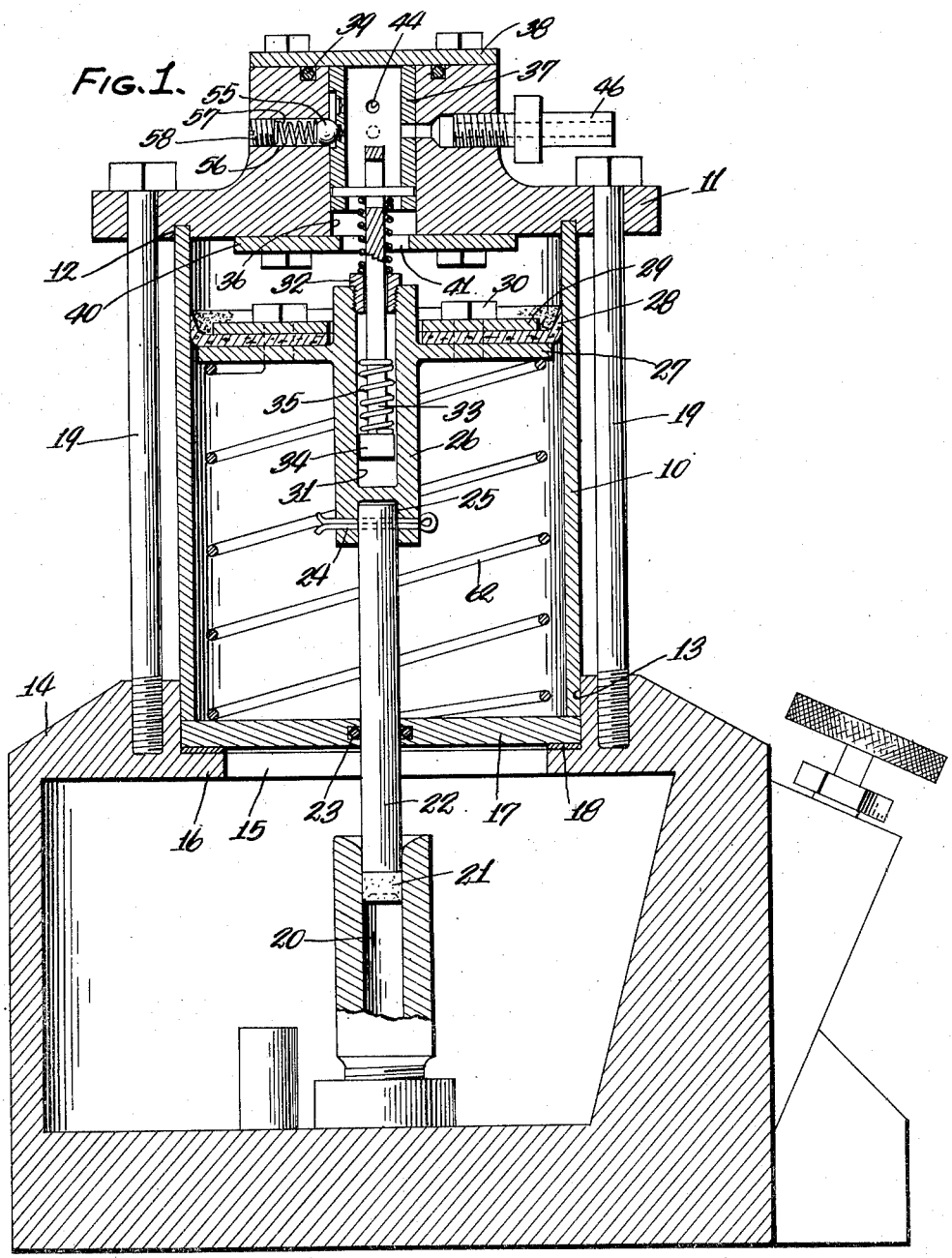
Figure 1 is a longitudinal sectional view through a fluid motor showing our improved construction in operative relation with a hydraulic pump.

Referring particularly to Figure 1 of the drawings, the fluid motor construction herein shown to disclose the invention is provided with a cylinder 10, formed by a tube open at both ends. One end of the cylinder 10 is closed by a header 11, and preferably this end is fitted into a groove in the adjoining surface of the header 11, as shown at 12.

The opposite end of the cylinder 10 may be closed in any suitable manner, and as herein shown this end fits into an opening 13 formed in the housing 14 of a hydraulic pump. The opening 13 is reduced, as shown at 15, to form a shoulder 16 for supporting a closure plate 17. The end of the cylinder bears against the plate 17, and a sealing gasket 18 is interposed between the plate 17 and the shoulder 16. A plurality of bolts 19 pass through apertures in the header 11 and are threaded into the housing 14, to provide means whereby the parts are drawn together in fluid-tight relation.

The hydraulic pump contained with the housing may be of any suitable construction, and as here shown, comprises a cylinder 20 for accommodating a piston 21 which is reciprocable therein. The piston 21 is formed on the lower end of a piston rod 22, this rod passing upwardly through a sealed aperture 23 formed in the plate 17, and into the cylinder 10, and having its upper end pinned, as at 24, to position within a socket 25 in the lower end of an elongated boss 26.

The boss 26 is integrally connected with a transversely extending circular flange 27 which provides a support for the piston leather 28, a disc 29 clamping the leather to the flange 27 through pressure applied by bolts 30. The boss 26 has an elongated opening 31 extending inwardly from its upper end, and an apertured plug 32 is threaded into the upper end of the opening.

A valve rod 33 extends through the aperture in the plug 32, and terminates inwardly of the opening 31 in a head 34. A coil spring 35 is interposed between the head 34 and the inner extremity of the plug 32, the spring being of such length that at certain times, as shown in Figure 1, it is out of engagement with the plug 32.

The header 11 is formed with a bore 36 forming a cylinder for receiving a reciprocable sleeve-valve 37. The upper end of the bore 36 is closed by a plate 38 which is bolted to the upper end of a reduced cylindrical portion of the header, an O-ring gasket 39 being interposed for fluid-sealing purposes. A plate 40, at the lower end of the bore 36, is formed with an aperture 41 which is smaller in diameter than the diameter of bore, so as to form an annular shoulder at this end of the bore.

The sleeve-valve 37 is provided with a longitudinal split 42, as best seen in Figure 4, for a purpose later to appear. This sleeve-valve 37 is also formed with an inlet aperture 43 and an exhaust aperture 44. The inlet aperture is adapted to communicate with an inlet opening 45 in the header 11 and is adapted to receive fluid under pressure from a suitable source (not shown) by means of a fluid line including the nipple 46.

The exhaust aperture 44 is adapted to communicate with an exhaust opening 47 (see Figure 3) in the header 11. Threaded in the exhaust opening 47 is a valve body 48 having ports 49 leading to the atmosphere. A needle valve 50, operable by means of a handle 51, controls passage of exhausted fluid to the atmosphere.

A depressed area 52 is formed in the outer side wall of the sleeve-valve 37, and in this area is a pair of spaced recesses 53, 54, each being engageable with a ball detent 55 mounted in a transverse aperture 56 formed in the header 11. A coil spring 57 is interposed between the ball detent 55 and a screw-plug 58, to urge the detent into seating relation with respect to one or the other of the recesses 53, 54.

As clearly seen in Figures 1 and 2, the sleeve-valve 37 is of less axial length than the bore 36 in the header 11, and at its lower end a pin 59 extends transversely thereof. The valve rod 33, at its upper end, is formed with an elongated slot 60 for receiving the pin 59. A coil spring 61 is disposed about the upper end of the valve rod 33 and is interposed between the pin 59 and the plug 32, this spring being of such length that at certain times (as seen in Figure 2) it is out of engagement with the pin 59.

In operation, and with the parts in position as shown in Figure 1, fluid under pressure passes through the nipple 46, inlet opening 45, inlet aperture 43, to the space within the sleeve-valve 37, and through this sleeve, the aperture 41 in the plate 40 to within the cylinder 10, so as to act on the piston and urge such piston downwardly against the force of a spring 62. Fluid pressure within the sleeve-valve 37 causes this valve, because of its split construction, to expand into good sealing relation with respect to the walls of the bore 36. This construction does away with the necessity of forming the bore 36 and the sleeve-valve 37 with extremely close tolerances, and thus reduces manufacturing costs. It will be appreciated that only average tolerances between the bore 36 and sleeve-valve 37 need to be held, and the expansion of the sleeve, which may be on the order of one or two thousandths of an inch, will effectively seal against leakage to the exhaust opening 47 in the header 11.

As the piston is moved downwardly in the cylinder 11, the position of the sleeve-valve is not affected until the piston reaches its lowermost position, because the elongated slot 60 in the valve rod 33 and the pin 59 provide a lost motion connection. However, during downward movement of the piston, the lower end of the plug 32 engages the upper end of the spring 35, and compresses this spring between it and the head 34 formed at the lower end of the valve rod 33. Such action urges the valve rod 33 downwardly so that the upper defining margin of the elongated slot 60 engages the cross pin 59. When the compressive force of the spring 35 reaches a predetermined amount, it overcomes the holding action of the ball detent 55 and moves the sleeve-valve 37 to position shown in Figure 2 with a snap action. The sleeve-valve 37 is limited in downward movement by engagement of its lower end with the annular abutment formed by the plate 40.

In the position of parts shown in Figure 2, the ball detent 55 is seated in the recess 53 to hold the sleeve-valve 37 from unintentional displacement. In this position, the exhaust aperture 44 in the sleeve-valve 37 is in communication with the exhaust opening 47 in the header 11, and as the piston is returned to upper position by the spring 62, fluid is exhausted from the cylinder by passage through the sleeve-valve 37, the exhaust aperture 44 and opening 47, through the valve body 48, and to the atmosphere through openings 49, at a rate depending upon the setting of the needle valve 50. If this valve is fully closed, operation of the piston in the cylinder 10 is fully stopped, but the piston may be immediately started in motion by opening of the valve 50, assuming that supply of fluid under pressure is not interrupted to the nipple 46. Further, by varying the opening of the valve 50, the speed of reciprocation of the piston may be controlled. Thus, by control of the exhaust, as compared with control of the fluid supply in prior constructions, action of the fluid motor may be readily controlled.

As the piston moves in the cylinder 10 toward its upper position, the plug 32 engages the spring 61 and compresses this spring between it and the pin 59. When the compressive force of the spring 61 reaches a predetermined amount, it overcomes the holding action of the ball detent 55 and moves the sleeve-valve 37 to position shown in Figure 1 with a snap action, and the ball detent then seats in the recess 54 to hold the sleeve-valve against unintentional displacement. The sleeve-valve 37 is limited in upward movement by engagement of its upper end with the plate 38.

By proper adjustment of the compressive force of the spring 52 acting on the ball detent 55, it is possible to effect shifting of the sleeve-valve 37 to intake and exhaust positions at the time when the piston in the cylinder 10 reaches the ends of its strokes. The depressed area 52 permits the ball detent 55 to freely snap in and out of recesses 53, 54 and yet prevents any bur which may form from such action from scoring the wall of the bore 36.

In view of the foregoing, it will be apparent to those skilled in the art that we have accomplished at least the principal object of our invention, and it also will be apparent to those skilled in the art that the embodiment herein described may be variously changed and modified, without departing from the spirit of the invention, and that the invention is capable of uses and has advantages not herein specifically described, hence it will be appreciated that the herein disclosed embodiment is illustrative only, and that our invention is not limited thereto.

We claim:

1. A fluid motor, comprising: a motor cylinder; a piston reciprocable within said cylinder and having an axially elongated recess; a head for closing one end of said cylinder, having an opening in communication with the interior of said cylinder aligned with the axis of movement of said piston; a sleeve reciprocable within said opening and having intake and exhaust ports in its defining wall which are communicable with inlet and exhaust passages in said head so as to control passage of fluid to said cylinder and the exhaust of fluid from said cylinder; a cross-pin traversing the opening in said sleeve; a valve rod having an elongated slot at one end providing lost motion connection with said cross-pin, and having a head at its other end; an abutment in the elongated recess in said piston; a first resilient means disposed between said abutment and said cross-pin and a second resilient means disposed between said abutment and the head on said valve rod; and spring-pressed detent means engageable with one or the other of a pair of spaced recesses formed in said sleeve, adapted to yieldably hold said sleeve in its various positions; the foregoing construction being such that depending upon the direction of movement of said piston, one of said resilient means will be compressed until its stored energy overcomes the holding action of said detent means, whereby said sleeve will be moved from one position to another with a snap action.

2. A fluid motor, comprising: a motor cylinder; a piston reciprocable within said cylinder and adapted to be operated by fluid from a pressure source; and valve means for controlling flow of fluid, comprising a valve cylinder and a valve sleeve reciprocable within said cylinder, and spring-pressed detent means extending through the valve cylinder wall and engageable with one or the other of spaced recesses formed in the outer wall of said valve sleeve to yieldably hold said sleeve in one of its various positions, said recesses being connected by an area depressed with respect to the outer wall surface of said valve sleeve and said depressed area extending beyond said recesses so that any burs which may form as a result of detent action on the sleeve are out of engagement with the valve cylinder wall.

3. A valve, for controlling flow of fluid, comprising: a cylinder; a valve member reciprocable within said cylinder; resiliently urged detent means extending through the wall of said cylinder and engageable with one or the other of spaced recesses formed in the peripheral surface of said valve member to yieldably hold said valve member in one of its various positions, said recesses being connected by an area depressed with respect to said peripheral surface and said depressed area extending beyond said recesses so that any burs which may form as a result of detent action on said valve member are out of engagement with the valve cylinder wall.

4. A fluid motor comprising a cylinder, a piston reciprocable within said cylinder and adapted to be operated by fluid from a pressure source, a valve comprising a sleeve open at either end at all times to provide for free passage of fluid therethrough, said sleeve being shiftable by movement of said piston to control flow of fluid to and from said cylinder, an elongated member extending axially of said piston and movable therewith, said member extending into said sleeve and being provided with an elongated slot, and a pin carried by said sleeve and extending through the slot in said elongated member, said pin and said slot cooperating to provide a lost motion connection between said sleeve and said piston.

5. A fluid motor comprising a cylinder, a piston slideable within said cylinder and spring-pressed to one position, said piston being engageable with said cylinder in fluid-tight relation, body means carried by said fluid motor, said body means providing a valve cavity and providing intake and exhaust conduits each terminating in respective ports formed in the wall defining said cavity, and valve means comprising a sleeve open at either end at all times to provide for free passage of fluid therethrough, the wall of said sleeve being adapted to cover the ports in the valve cavity and said sleeve being movable within the cavity to one position whereby the intake port will be uncovered and the exhaust port covered so that fluid may flow from a source to the interior of said cylinder to drive said piston in a direction opposed to the urging force of the spring, and said sleeve being movable to another position whereby the exhaust port will be uncovered and the intake port covered so that fluid within said cylinder may be exhausted to the atmosphere and said piston may be spring-pressed to its starting position.

6. A fluid motor comprising a cylinder, a piston slideable within said cylinder and spring-pressed to one position, said piston being engageable with said cylinder in fluid-tight relation, body means carried by said fluid motor, said body means providing a valve cavity and providing intake and exhaust conduits each terminating in respective ports formed in the wall defining said cavity, and valve means comprising a sleeve open at either end at all times to provide for free passage of fluid therethrough, the wall of said sleeve being apertured to provide axially spaced-apart opening alignable with said intake and exhaust ports, said sleeve being movable within said cavity to one position whereby the intake port will be uncovered and the exhaust port covered so that fluid may flow from a source to the interior of said cylinder to drive said piston in a direction opposed to the urging force of the spring, and said sleeve being movable to another position whereby the exhaust port will be uncovered and the intake port covered so that the fluid within said cylinder may be exhausted to the atmosphere and said piston may be spring-pressed to its starting position.

7. A fluid motor, comprising: a motor cylinder; a piston reciprocable within said cylinder and having an axially elongated recess; a head for closing one end of said cylinder, having an opening in communication with the interior of said cylinder aligned with the axis of movement of said piston; a sleeve reciprocable within said opening and having intake and exhaust ports in its defining wall which are communicable with inlet and exhaust passages in said head so as to control passage of fluid to said cylinder and the exhaust of fluid from said cylinder; a cross-pin traversing the opening in said sleeve; a valve rod having an elongated slot at one end providing lost motion connection with said cross-pin, and having a head at its other end; an abutment in the elongated recess in said piston; a first resilient means disposed between said abutment and said cross-pin and a second resilient means disposed between said abutment and the head on said valve rod; the foregoing construction being such that depending upon the direction of movement of said piston, one or the other of said resilient means will be compressed and transmit moving force to said sleeve, thereby moving said sleeve from one position to another.

8. A fluid motor comprising a motor cylinder, a piston reciprocable within said cylinder and adapted to be operated by fluid from a pressure source, and valve means for controlling flow of fluid, comprising a valve cylinder and a valve sleeve reciprocable within said cylinder, and spring-pressed detent means extending through the valve cylinder wall and engageable with one or the other of spaced recesses formed in the outer wall of said valve sleeve to yieldably hold said sleeve in one of its various positions, said recesses being connected by an area depressed with respect to the outer wall surface of said valve sleeve, said depressed area cooperating with said detent means to provide a key action restricting rotation of said valve sleeve.

9. A fluid motor comprising a motor cylinder, a piston wthin said cylinder and adapted to be operated by fluid from a pressure source, valve means for controlling flow of fluid from said source to said cylinder, comprising a valve cylinder and a tubular liner within said valve cylinder and constituting a valve sleeve reciprocable within said cylinder, said tubular liner being longitudinally split so that pressure of said fluid expands said liner into sealing engagement with the walls of said valve cylinder, and a connection between said liner and said piston, said connection being removed from the split of said liner whereby expansion of the same is unaffected.

10. A fluid motor comprising a motor cylinder, a piston within said cylinder and adapted to be operated by fluid from a pressure source, valve means for controlling flow of fluid from said source to said cylinder, comprising a valve cylinder and a tubular liner within said valve cylinder and constituting a valve sleeve reciprocable withing said cylinder, said tubular liner being longitudinally split so that pressure of said fluid expands said liner into sealing engagement with the walls of said valve cylinder, and a connection between said liner and said piston, including a cross pin extending across unsplit walls of said sleeve whereby expansion of said liner is unaffected.

11. In a fluid motor, a piston reciprocable within a cylinder and movable by fluid pressure thereagainst, valve means for controlling flow of fluid under pressure to said cylinder, comprising a valve cylinder and a valve member reciprocable between two positions within said valve cylinder, and lost motion connection means connecting said valve member and said piston and comprising a valve actuating member slidable through an abutment formed on said piston and having a slot extending in its direction of movement, a pin carried by said valve member and receivable within the slot of said member to provide lost motion in said direction of movement, and springs about said member and disposed on opposite sides of said abutment.

12. In a fluid motor, a piston reciprocable within a cylinder and movable by fluid pressure thereagainst, valve means for controlling flow of fluid under pressure to said cylinder, comprising a valve cylinder and a tubular valve member axially reciprocable between two positions within said valve cylinder, and lost motion connection means connecting said valve member and said piston, comprising a pin extending cross-wise of the opening through said valve member and an operating member movable in line with said valve member and having a slot extending in line with its movement and receiving said pin.

13. In a fluid motor, a piston reciprocable within a cylinder and movable by fluid pressure thereagainst, valve means for controlling flow of fluid under pressure to said cylinder, comprising a valve cylinder and a tubular valve member axially reciprocable between two positions within said valve cylinder, and lost motion connection means connecting said valve member and said piston, comprising a pin extending cross-wise of the opening through said valve member, an operating member slidable through a portion of said piston and movable in line with said valve member, said operating member having a slot extending in line with its movement and receiving said pin, opposite ends of said slot being engageable with said pin to bodily move said valve member, and springs on opposite sides of said piston portion, one spring being interposed between said piston portion and said pin, and the other spring being interposed between said piston portion and an abutment formed on said operating member.

References Cited in the file of this patent

UNITED STATES PATENTS

| 219,739 | Kirsten | Sept. 16, 1879 |
|---|---|---|
| 917,917 | White | Apr. 13, 1909 |
| 1,044,725 | Bain | Nov. 19, 1912 |
| 1,094,811 | Reagan et al. | Apr. 28, 1914 |
| 1,282,841 | Iles | Oct. 29, 1918 |
| 2,028,938 | Longette et al. | Jan. 28, 1936 |
| 2,057,364 | Bystricky | Oct. 13, 1936 |
| 2,220,339 | Leathem | Nov. 5, 1940 |
| 2,258,493 | Hull | Oct. 7, 1941 |
| 2,346,026 | Henricks | Apr. 4, 1944 |
| 2,430,019 | Jenkins | Nov. 4, 1947 |
| 2,658,485 | Dreyer | Nov. 10, 1953 |

FOREIGN PATENTS

| 16,407 | Great Britain | Aug. 9, 1906 |
|---|---|---|
| 63,691 | Sweden | Sept. 13, 1927 |